No. 773,656. PATENTED NOV. 1, 1904.
H. J. LESCHEN.
AUTOMATIC AERIAL WIRE ROPE TRAMWAY.
APPLICATION FILED DEC. 7, 1903.
NO MODEL. 8 SHEETS—SHEET 1.

Fig. 1.

Witnesses: Inventor:
G. Sargent Elliott. Harry J. Leschen.
Bessie Thompson By
H. S. Bailey.
Attorney.

No. 773,656. PATENTED NOV. 1, 1904.
H. J. LESCHEN.
AUTOMATIC AERIAL WIRE ROPE TRAMWAY.
APPLICATION FILED DEC. 7, 1903.
NO MODEL. 8 SHEETS—SHEET 3.

Witnesses: Inventor:
Harry J. Leschen
By H. S. Bailey, Attorney.

No. 773,656. PATENTED NOV. 1, 1904.
H. J. LESCHEN.
AUTOMATIC AERIAL WIRE ROPE TRAMWAY.
APPLICATION FILED DEC. 7, 1903.
NO MODEL. 8 SHEETS—SHEET 4.

Witnesses:
Inventor:
Harry J. Leschen.
By H. S. Bailey, Attorney.

No. 773,656. PATENTED NOV. 1, 1904.
H. J. LESCHEN.
AUTOMATIC AERIAL WIRE ROPE TRAMWAY.
APPLICATION FILED DEC. 7, 1903.
NO MODEL. 8 SHEETS—SHEET 5.

Witnesses:
G. Sargent Elliott.
Bessie Thompson Inventor:
By Harry J. Leschen,
H. S. Bailey. Attorney.

No. 773,656. PATENTED NOV. 1, 1904.
H. J. LESCHEN.
AUTOMATIC AERIAL WIRE ROPE TRAMWAY.
APPLICATION FILED DEC. 7, 1903.
NO MODEL. 8 SHEETS—SHEET 6.

No. 773,656. PATENTED NOV. 1, 1904.
H. J. LESCHEN.
AUTOMATIC AERIAL WIRE ROPE TRAMWAY.
APPLICATION FILED DEC. 7, 1903.
NO MODEL. 8 SHEETS—SHEET 7.

No. 773,656. PATENTED NOV. 1, 1904.
H. J. LESCHEN.
AUTOMATIC AERIAL WIRE ROPE TRAMWAY.
APPLICATION FILED DEC. 7, 1903.
NO MODEL. 8 SHEETS—SHEET 8.

No. 773,656.

Patented November 1, 1904.

UNITED STATES PATENT OFFICE.

HARRY J. LESCHEN, OF ST. LOUIS, MISSOURI, ASSIGNOR TO THE A. LESCHEN AND SONS ROPE COMPANY, OF ST. LOUIS, MISSOURI, A CORPORATION OF MISSOURI.

AUTOMATIC AERIAL WIRE-ROPE TRAMWAY.

SPECIFICATION forming part of Letters Patent No. 773,656, dated November 1, 1904.

Application filed December 7, 1903. Serial No. 184,178. (No model.)

*To all whom it may concern:*

Be it known that I, HARRY J. LESCHEN, a citizen of the United States of America, residing in the city of St. Louis and State of Missouri, have invented certain new and useful Improvements in Automatic Aerial Wire-Rope Tramways; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in automatic aerial wire-rope tramways; and the objects of the invention are, first, to provide means for automatically retarding and stopping each bucket at the loading and dumping stations; second, to provide means for starting and gradually accelerating each bucket at the loading and dumping stations; third, to provide in those tramways in which the buckets are automatically attached to and released from the running or traction rope and in which the buckets are gradually retarded and brought to a stop at the loading and dumping stations and are picked up, started, and accelerated and attached to the running-rope means for starting and for gradually accelerating the stationary or standing buckets enough faster than the speed at which the incoming buckets are traveling at from the time they are released and are brought to a stop to prevent the incoming bucket from striking the standing bucket before it can be moved out of the standing or dumping stations; fourth, to provide a bucket starting and accelerating device that will permit the use of buckets of very large carrying capacity and that will permit the standing bucket to be started and gradually accelerated at the same relative speed that the incoming bucket is being gradually retarded and brought to a stop; fifth, to provide means for positively gripping and holding a bucket at the loading and dumping stations. I attain these objects by the mechanism illustrated in the accompanying drawings, in which—

Similar figures of reference refer to similar parts throughout the several views.

Figure 1:
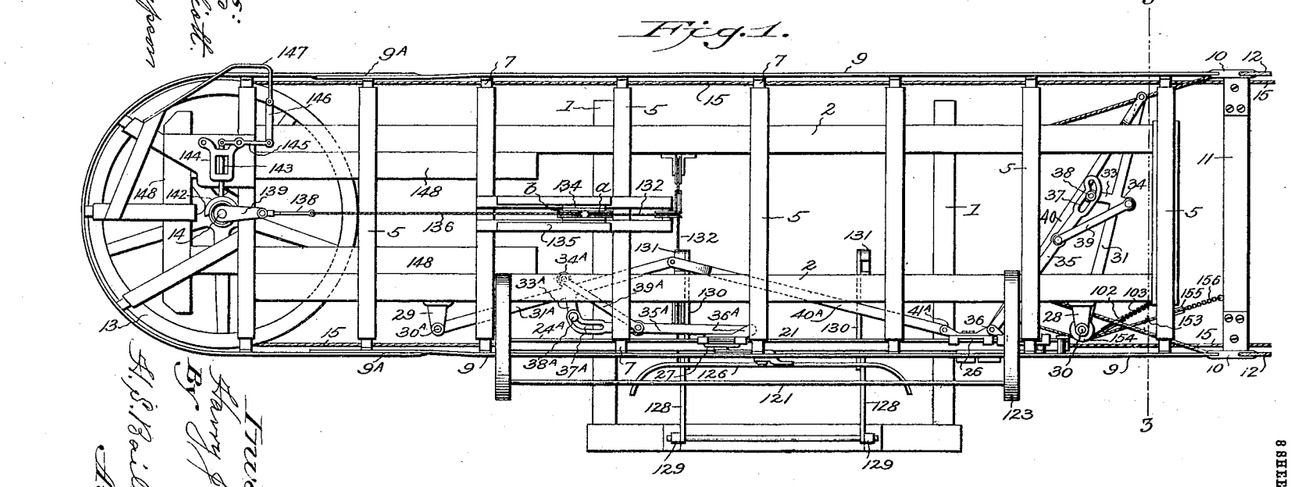
Figure 1 is a plan view of the dumping terminal of an aerial wire tramway equipped with my improved bucket starting and accelerating device.
Figure 2:
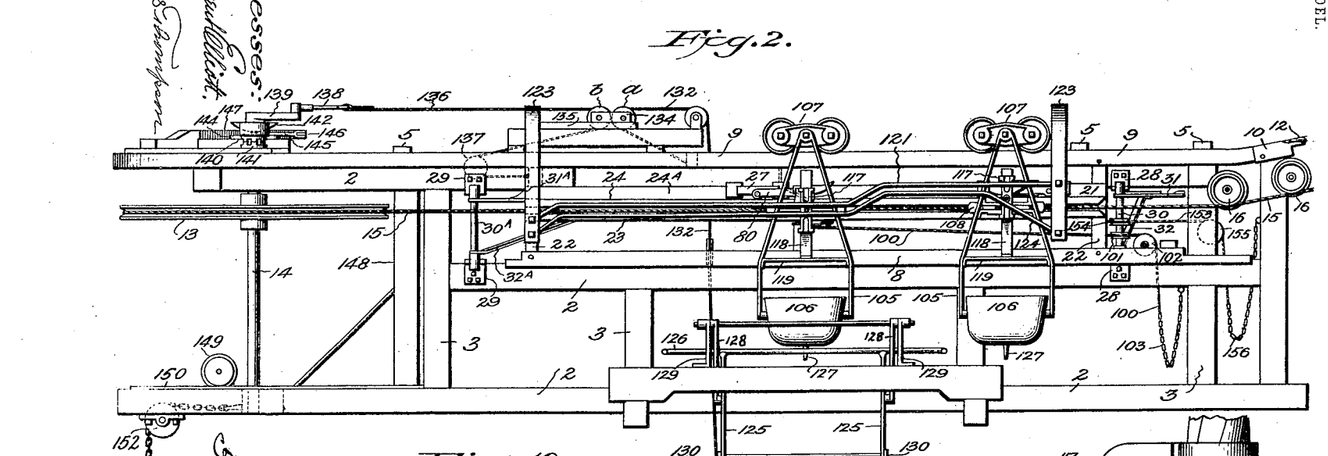
Fig. 2 is a side view thereof, showing two buckets in the terminal, one of which is in position to be released by the clip, while the other is at rest and is engaged by the dumping mechanism preparatory to being dumped.
Figure 3:
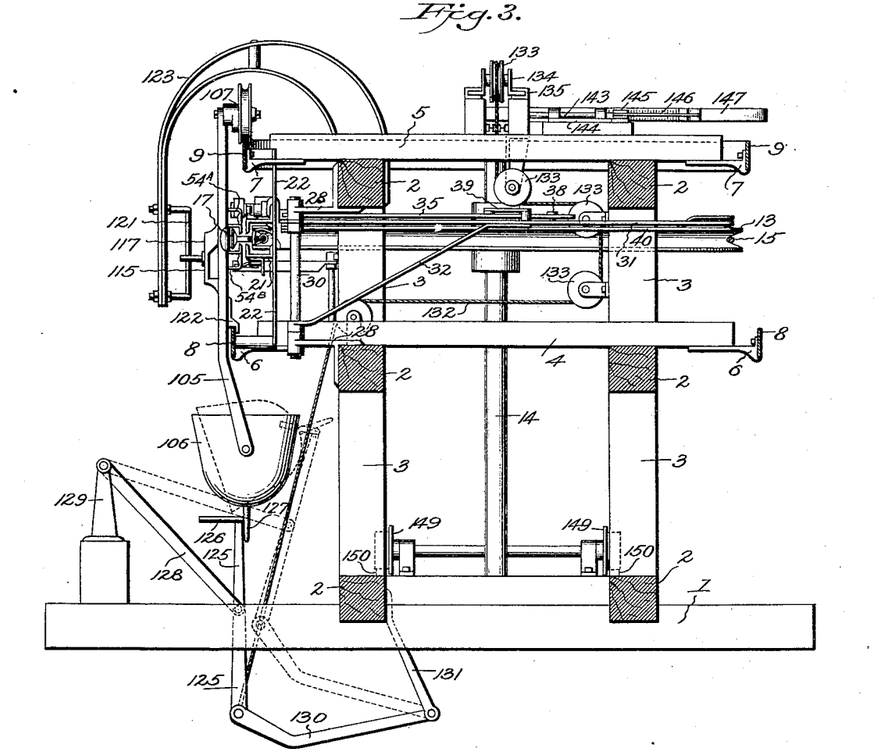
Fig. 3 is a transverse sectional view of the terminal on the line 3 3 of Fig. 1, showing a bucket in a position just prior to its release from the dip of the running-rope.

Referring to the accompanying drawings, Figs. 1, 2, and 3 illustrate, respectively, a plan view, a side elevation, and a transverse sectional view of the dumping terminal of an aerial wire-rope tramway. The terminals are designated as "loading" and "dumping" terminals and may be placed any distance apart from a few hundred feet to several miles. These terminals are connected by stationary or track ropes, upon which the trolleys of the buckets travel, and by a running or traction rope, to which are secured at suitable intervals clips, which are designed to engage a suitable grip carried by the bucket-pendants, so that the said buckets may be moved thereby. The traction-rope is an endless continuous running-rope and passes around a suitable horizontally-disposed gripping-wheel mounted in the outer end of each terminal, while the track-ropes are connected to and at the entrance or rear end of each terminal, where they are suitably anchored, and a metal track is connected to the stationary or track ropes and is substituted therefor, which extends along each side of the terminal and around its outer end in a semicircle concentric with the gripping-wheel. The traction and track ropes are supported at intervals between the terminals by towers, which are provided with saddles on which sheaves are mounted on which the traction and track ropes are supported and run at suitable distances above the ground.

My present invention relates to improvements in that type of aerial wire-rope tramways known as "automatic" tramways and directly to the type of tramways embodied in Patent No. 666,267, issued January 22, 1901, in which type of tramway the buckets are automatically attached and detached to and from the traction-rope and are automatically retarded in speed and brought to a stop and are then dumped at a point called the "stopping-station" and are then started and again engaged by a clip and carried around the loading terminal and out on the stationary or track rope to the opposite terminal, where they are again detached, retarded, stopped, and loaded, and again picked up and carried to the dumping terminal. The bucket stopping-station may be either a loading or a dumping station, as while material, such as ore or coal, may be loaded at the mine at one terminal and dumped at the other terminal supplies may also be loaded at the dumping terminal and carried up to the loading terminal.

In the system mentioned in the above-mentioned patent it has been found in practice that the accelerating device will only permit buckets to be used that will hold at the most five cubic feet of material. This size of bucket is the largest that can be used with that tramway, and it is of ample capacity for conveying ores and heavy material, and the tramway embodied in the above-mentioned patent is in extensive practical use and with this size of bucket works to perfection. When, however, a large tonnage of a light-weight material, such as coal, is to be moved by a tramway, it is necessary to use buckets that will carry eight, ten, and twelve or more cubic feet, and they cannot be used on that system of tramway, as they take up so much room that the incoming buckets strike the standing buckets before they are started and moved out of the standing, loading, or dumping stations, and it is essential in order to use these larger-capacity buckets to prove a bucket-accelerating device that will pick up, start, and accelerate buckets of any size that it is practical to use on aerial wire-rope tramways without their interfering with one another.

As both terminals are alike in their bucket-operating mechanism and except as to their bucket loading and dumping mechanism, a description of one will suffice for both, and I have preferably illustrated the dumping terminal.

Each terminal comprises a suitable framework constructed of heavy timbers.

The numeral 1 refers to the sills, 2 to three pairs of longitudinal ties, the lower pair of which rests upon the sills, while the middle and upper pair are supported by posts 3. Upon the middle and upper pair of ties are secured at intervals cross-beams 4 and 5, respectively, to the outer ends of which are secured brackets 6 and 7, to which are bolted metal tracks 8 and 9. The ends of the upper track 9, which terminate at the entrance of the terminal, have secured thereto saddles 10, which are also secured to a cross-bar 11, forming part of the framework of the terminal. Track-ropes 12, extending from the opposite terminal, pass over these saddles, and their ends are securely anchored into the framework of the terminal. This track extends on each side of the terminal and is curved around its opposite end in a semicircle concentric with, but a suitable distance above a rope-gripping sheave 13, which is keyed upon a shaft 14, journaled in bearings secured to the framework of the terminal. The tracks 9 and track-ropes 12 thus form a continuous track from one terminal to the other. The lower tracks 8 extend a suitable distance on each side of the terminal, though they may continue entirely around the same as the upper tracks, if desired. The object of these tracks is to guide the buckets as they enter the terminal and to keep them from swinging from the time they enter the terminal until after they have been automatically dumped, as will hereinafter be fully set forth.

An endless traction-rope 15 enters on each side of the terminal, passing under sheaves 16 and extending around the gripping-sheave 13 at the opposite end of the terminal. To this rope are attached at intervals suitable clips 17, comprising eyes 18, which encircle the rope and are securely clamped thereon, and a stem 19, extending from the eyes, the outer end of which is formed with a circular head 20, which engages the bucket-grip, as will presently appear. It is necessary that the clip shall be maintained in a horizontal position and be prevented from swerving either up or down from the time it enters the terminal and escapes from the bucket-grip until it picks up another bucket at the opposite end of the terminal, and this is accomplished by a "clip-guide" 21, which is supported midway between the tracks 8 and 9 by metal strips 22, which are secured to the said tracks and to which the said clip-guide is bolted. This clip-guide comprises a lower member 23 in the form of an ordinary channel-bar and an upper member 24, which I term a Z-bar, owing to its shape in cross-section. This Z-bar is arranged so that one of its vertical members shall run parallel with the outside vertical member of the channel-bar but a slight distance above the same, leaving a narrow space or slot through which the stem of the clip will pass, while its other vertical member forms a track 24$^A$, upon which are mounted suitably-constructed slides 25, 26, and 27. The slide 25 I term the "bucket-receiving" slide, the slide 26 I term the "clip-operated" slide, and the slide 27 I term the "bucket-starting and accelerating" slide. The slides 25 and 27 carry mechanism which respectively effects the stopping and starting again of the bucket, while the slide 26 is moved a predetermined distance forward by each clip as it passes through the clip-guide and effects the movement of the slides 25 and 27 through a system of levers which are connected together and to the several slides, as will be fully explained.

Adjacent to each end of the terminal and on that side at which the buckets enter I secure a pair of brackets 28 and 29, the brackets 28 being secured one above the other near the entrance end of the terminal, while the brackets 29 are secured in the same way near the opposite end of the terminal. The upper brackets 28 and 29 of each pair are bolted to one of the upper longitudinal ties 2, while the lower brackets of each pair are bolted to one of the middle ties. Vertical shafts 30 and 30$^A$ respectively connect the brackets at each end of the terminal, and upon the shaft 30 of the brackets 28 is supported a lever 31, which I term an "abutment-lever" and which in the present instance is of a length to extend to the opposite side of the terminal. This lever is prevented from sagging by an arm 32, which is secured to its under side about midway of its length and is supported at its other end upon the shaft 30, which passes through the end of the lever 31 and its supporting-arm. The lever 31 lies just below the upper pair of ties and has a swinging movement in a horizontal plane. The lever 31 about midway of its length is formed with lateral extensions 33 and 34, and to the extension 33 is pivoted one end of a lever 35, the other end of which is pivoted between ears 36, which are an integral part of the slide 25. The end of the lever 35 which is pivoted to the extension 33 of lever 31 is curved horizontally, its curved portion being substantially at right angles to the length of the lever. This curved end of the lever is provided with a slot 37, which extends a short distance into the straight part of the lever, and a suitable bolt or pin 38 passes through the slot and through the extension 33 and secures the lever to the extension in such a manner that it has a free sliding movement thereon to the extent of the length of its slot 37. A short lever 39 is pivoted at one end of the lever 35 slightly beyond its center, and the opposite end of this short lever is pivoted to the lateral extension 34 of the lever 31. To the extremity of the lever 31 is pivoted one end of a lever 40, the opposite end of which is secured between a pair of ears 41, which are an integral part of the slide 26, a similar pair of ears 41$^A$ being formed on the other end of the slide.

Upon the shaft 30$^A$ of the brackets 29 is pivoted a lever 31$^A$ in all respects similar to the lever 31, being provided with a supporting-arm 32$^A$ and having lateral extensions 33$^A$ and 34$^A$, and to the extension 33$^A$ is pivoted one end of a lever 35$^A$. The end of the lever 35$^A$ which is pivoted to the extension 33$^A$ is curved and provided with a slot 37$^A$ similar to the lever 35, before mentioned, and this curved end secured upon the extension 33$^A$ by a bolt or pin 38$^A$, which passes through the slot and through the extension, the opposite end of the lever being pivoted between ears 36$^A$, which form an integral part of the slide 27. The lever 35$^A$ is further connected to the lever 31$^A$ by a short lever 39$^A$, which is pivoted at one end to the lever 35$^A$ beyond its center and at its other end to the extension 34$^A$ of the lever 31$^A$. To the extremity of the lever 31$^A$ is pivoted one end of a lever 40$^A$, the opposite end of which is pivoted between ears 41$^A$ of the slide 26. The two sets of levers are thus identical in construction and operate in the same manner, both being actuated by the slide 26, which is carried by the clips as they pass through the clip-guide, as will presently be fully described.

Figures 15, 16:
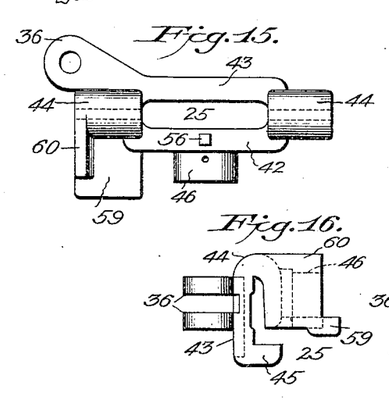
Figs. 15, 16, and 17 are respectively a plan view, an end elevation, and a front elevation of the sliding frame to which the stop-lever and dog are pivoted.
Figure 17:
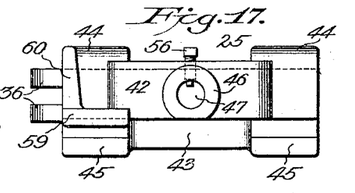
Figure 20:
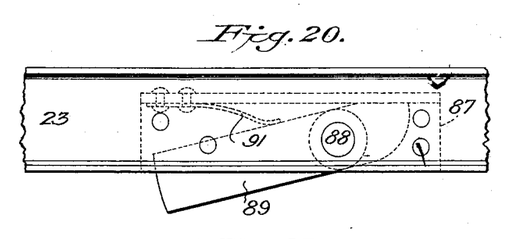
Fig. 20 is a plan view of the lower member or channel-bar of the clip-guide, showing a spring-controlled trigger pivoted to the under side thereof, the same being to prevent the backward movement of the bucket after it has been moved to its dumping position.
Figure 21:
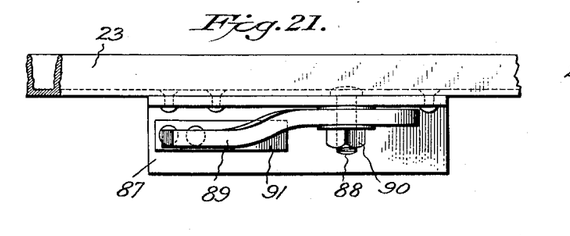
Fig. 21 is a front elevation of the same, showing an angle-bar secured to the under side of the channel-bar to which is secured the trigger-actuating spring.
Figure 22:
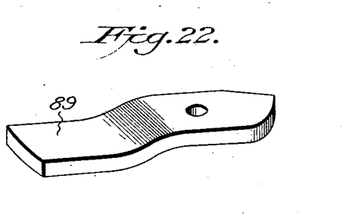
Fig. 22 is a perspective view of the trigger detached.
Figure 23:
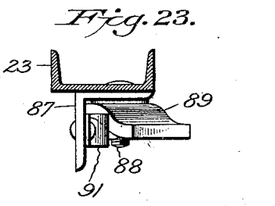
Fig. 23 is a transverse sectional view through the channel-bar, showing the trigger, spring, and angle-bar in end elevation.

The slide 25 (see Figs. 15, 16, and 17) comprises front and rear plates 42 and 43, respectively, to the ends of which are formed integral hooks or hangers 44, which slide upon the track 24$^A$ of the clip-guide. These hangers are retained in engagement with the track by lugs 45, which project from the rear plate 43 of the slide and lie beneath the track. A hub 46 is formed centrally of the front plate 43, having a bore 47, in which a hollow spindle 48 is journaled. To the outer end of the spindle is rigidly secured one end of an arm 49, which I term a "stop-arm." The outer end of this arm is bent inwardly at right angles to form a projection, as shown at 50, and a horizontal plate 51 extends outwardly from the upper edge of this end of the arm a short distance and has a stop 52 formed thereon by bending the plate down at right angles, as shown. The rear edge of this stop is vertically disposed, and from the lower end of this edge the metal is curved to the upper forward end. The projection 50 is designed to engage a suitable trip 50$^A$. When the slide 25 reaches the limit of its forward movement, the projection 50 will ride up the inclined face of the trip, and thus raise the arm 49 and release a bucket, as will be fully hereinafter explained. A dog 53 operates in connection with the stop 52 to hold the bucket. This dog comprises an arm the forward portion of which is formed with a rearwardly-inclined plate 54, which lies in the pathway of an abutment 54$^A$ on the bucket-pendant. A stem 55 is rigidly secured in any suitable manner near the rear end of the arm of the dog, and this stem is of a diameter to fit within the hollow spindle of the stop-arm, so that the dog and stop-arm will lie side by side, the stop-arm being slightly the longer. When in this position, the dog and stop-arm are secured within the hub of the slide 25 by a set-screw 56 in the top edge of the plate 42, which enters the bore 47 of the hub and which passes through a slot 57 near the end of the hollow spindle and into a groove 58 in the stem. The stop-arm and dog are thus permitted a limited swinging movement up and down, but are prevented from becoming detached from the hub of the slide. As a bucket enters the terminal the abutment 54$^A$ will lift the dog by contacting with its inclined plate 54 and will immediately contact with the stop 52 and be held between the stop and dog. The dog and stop-arm are prevented from dropping below a horizontal position by a plate 59, which projects from the forward hook of the slide 25, so as to lie beneath the arms and support them. This plate is strengthened by a web 60, as shown. The rear end of the dog 53 is curved backward, as shown at 53$^A$, so as to present an inclined surface which will prevent the abutment 54$^A$ of the bucket-pendant as it passes from catching upon the said dog.

Figure 32:
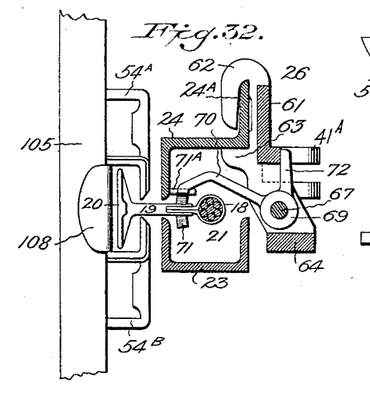
Fig. 32 is a sectional view through the sliding frame which supports the dogs and through the clip-guide of the terminal, a portion of the bucket-pendant being shown in connection therewith and a clip in the act of being released from the pendant and engaging one of the aforesaid dogs.

The slide 26, Figs. 6, 7, 9, and 32, comprises a plate 61, upon each end of which is formed a hook 62, which hooks are designed to slide upon the track 24$^A$ of the clip-guide and are held in engagement therewith by lugs 63, which project forwardly from the plate and lie beneath the track. A depending frame or bracket 64 is formed integral with the plate 61 and comprises end members which are connected by a bottom strip. At each end of the slide is formed a pair of ears 41 and 41$^A$, respectively, the two upper ears being formed integral with the plate 61 and are joined by a rib 66, while the lower ears are formed integral with the end members of the frame 64. Each end member is formed with a hole, and through these holes passes a pin 67, which is suitably secured in the frame and upon which is mounted a pair of dogs 68. These dogs are identical in construction and comprise a hub 69, through which the pin 67 passes, and a substantially arched plate 70, which extends forward from the hub, its extremity being formed with a downwardly-extending stop 71, the inner edge of which is vertical, while its lower edge is inclined from the vertical edge to its upper outer end. These dogs lie side by side upon the pin 67 and extend into the clip-guide, as shown in Fig. 32, so that their forward ends will be in the path of the clips as they pass through the clip-guide. Their position is defined by lugs 72, which extend upward from the hubs and contact with the rib 66 of the plate 61 of the slide. The space between the two stops 71 is sufficient to permit the stem of the clip free movement therein. As a clip passes through the guide it contacts with the inclined edge of the stop of the first dog, raises the said dog, and passes in between the two stops, contacts with the vertical edge of the stop of the second dog, which prevents its escape, and thus the slide 26 is carried forward by the clip until it reaches the limit of its forward movement, when the inclined edge of the forward stop strikes a pin $71^A$ in the flange of the Z-bar, which raises the dog and permits the clip to escape.

The slide 27 is a left-hand duplicate of slide 25 and comprises front and rear plates 73 and 74, respectively, to the ends of which are formed integral hooks 75, which slide upon the track $24^A$ of the clip-guide. These hangers are retained in engagement with the track by lugs 76, which project from the rear plate 74 of the slide and lie beneath the track. A hub 77 is formed centrally of the front plate 73, having a bore 78, in which a stem 79 is journaled. To the outer end of this stem is rigidly secured one end of an arm 80, which I term the "bucket-starting" arm. Upon the rear end of this arm is formed a horizontal plate 81, the rear portion of which is formed into a vertically-disposed hook 82, the under edge of which is inclined upward, as shown. The forward end of the plate depends a suitable distance to form a stop 83, between which and the hook 82 the abutment $54^A$ of the bucket-pendant is held when the bucket is moved from its dumping position by the starting-arm 80. This arm is prevented from dropping below a horizontal position by a plate 84, which projects from the rear hook 75 of the slide and lies beneath the arm. The arm is prevented from becoming disengaged from the hub of the slide by a set-screw 85 in the upper edge of the front plate 73 of the slide, which enters the bore 78 of the hub and projects into a circumferential slot near the end of the stem 79. The arm while thus being held in place is permitted a limited rocking movement.

Figures 4, 18, 19:
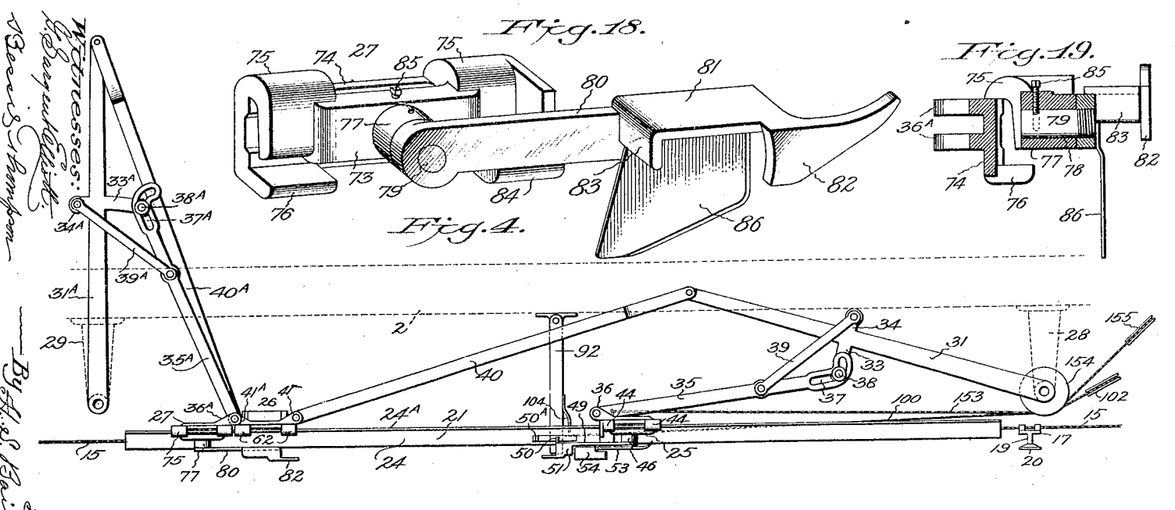
Fig. 4 is a plan view of my improved bucket starting and accelerating mechanism, showing the same in a reverse position to that illustrated in Fig. 1, the main actuating-lines being arranged to stand at right angles to the direction of the terminal when at the limit of their movement instead of at slight inclination thereto, as illustrated in Fig. 1, the terminal being omitted for the sake of clearness.
Fig. 18 is a perspective view of the rear bucket-mover and sliding frame to which it is pivotally attached.
Fig. 19 is a vertical sectional view through the sliding frame shown in Fig. 18 and bucket-moving hook, showing the pivotal connection of the hook with the frame.
Figure 5:
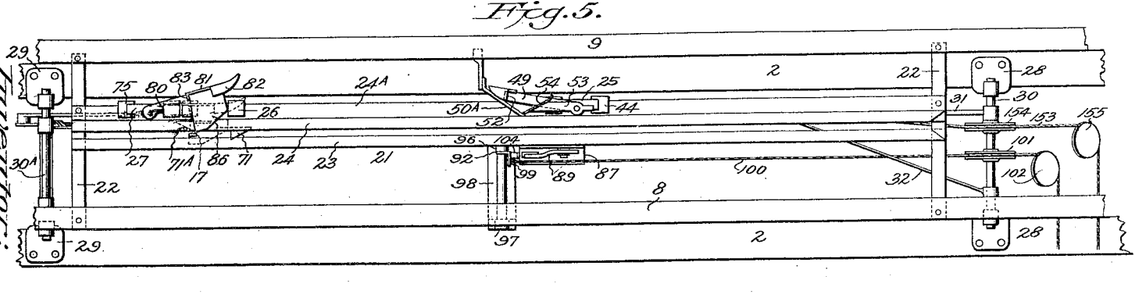
Fig. 5 is a front elevation of the mechanism shown in Fig. 4, the tracks and a portion of the terminal being shown.
Figure 6:
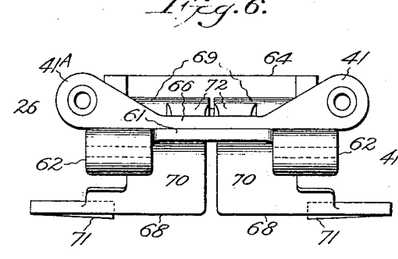
Fig. 6 is a plan view of the clip-actuated dogs and their supporting-slide, the said dogs being engaged by the traction-rope clip as it escapes from one bucket and being moved by the clip until said clip engages another bucket.
Figure 7:
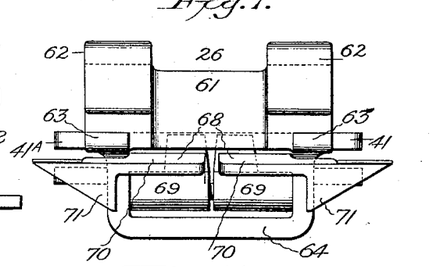
Fig. 7 is a front elevation of the same.

A vertical plate 86 is secured to the arm 80 between the hook 82 and stop 83. This plate extends down in front of the clip-guide and across the slot through which the clips pass, and its bottom edge is inclined upward and is designed to be engaged by a clip, so as thereby to lift the arm 80 and release a bucket. The lower and rear edges of this plate are beveled, as shown, so as not to interpose any obstruction to a passing bucket. The slide 25, carrying the stop-arm and dog, moves from the entrance end of the clip-guide to about midway of its length, or just above the bucket-dumping mechanism, to be presently described, where it deposits a loaded bucket, which is held by suitable mechanism while being dumped, the slide 25 being moved by the lever 35 of the first set of levers, which is pivoted to the lever 31. The slide 27 moves forwardly from the point where the bucket is dumped to the opposite end of the clip-guide, carrying with it an empty bucket, by means of its starting-arm 80 and is moved by lever $35^A$ of the second set. The slide 26 moves from a position near the entrance of the clip-guide and alongside the slide 25 at its starting-point (see Fig. 1) to the opposite end of the clip-guide and alongside the slide 27 at the limit of its forward movement. (See Fig. 4.) The ears 41 and $41^A$ of the slide 26 are on a lower plane than the ears 36 and $36^A$ of the slides 25 and 27, respectively, in order that at the limit of its movement in one direction the rear pair of its ears 41, or those to which lever 40 is pivoted, may lie directly beneath the ears 36 of slide 25, while at the opposite limit of its movement its forward ears $41^A$, or those to which lever $40^A$ is pivoted, may lie directly beneath the ears $36^A$ of slide 27. The levers 40 and $40^A$ are each operated by the slide 26, which in turn is operated by the clips as they pass through the clip-guide. The lever 40 operates a set of coöperating levers which first retard the buckets as they enter the terminal and are released from the rope-clip and then bring them to a pause in position to be engaged by the dumping mechanism, while the lever $40^A$ operates a similar set of levers, which effect the starting again of the buckets after they have been dumped and their further movement to the forward end of the clip-guide, where they are released from the starting-arm by a passing clip and carried around and out of the terminal by the same clip. The movement of the two sets of levers is identical, with this difference: The lever 35 on its forward movement is gradually retarded with respect to lever 40, while the lever $35^A$ is gradually accelerated with respect to its lever $40^A$; but when the levers return to their normal position the reverse takes place, and lever $35^A$ is retarded while the lever 35 is accelerated. This result is accomplished by the short connecting-levers 39 and $39^A$, which operate in the following manner: As the lever 31 moves forward the short lever 39 will also move lever 35, but more slowly, because until after the lever 31 reaches a point in its forward movement when its pivotal connection with the slotted end of lever 35 and the pivotal connection of lever 39 with levers 35 and 31 are in alinement through their pivotal centers the said lever 39 will exert a pulling motion on lever 35, which will shorten the radius of its movement until the bottom end of its slot 37 will be adjacent to its pivot 38, after which as the lever reaches the limit of its movement the opposite end of the slot will be adjacent to the pivot. During this movement of lever 35 the lever 35$^A$ is drawn quickly forward by reason of its reverse position and that of the short lever 39$^A$, which acts directly upon the lever 35$^A$, causing it to slide up upon its pivot 38$^A$, thus reducing the radius in which its outer end would travel, and thereby accelerating its movement. Thus the momentum of a bucket after being disengaged from a clip on entering the terminal is gradually lessened, and then the bucket is brought to a complete stop at the dumping-point, while at the same time an empty bucket is started and moved from the dumping-point forward to the end of the clip-guide, its momentum being gradually accelerated until it acquires the speed of the running-rope, when it is released from its starting-arm and instantaneously engaged by a clip, the same clip having effected its release from the starting-arm, as will be further explained.

Figure 24:
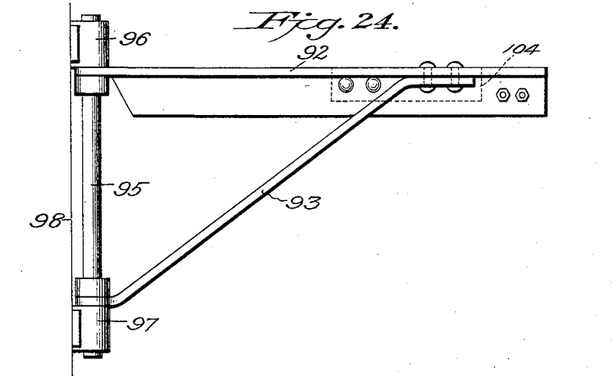
Fig. 24 is a side elevation of a weight-controlled swinging stop-arm against which the bucket strikes and is stopped on being moved to its dumping position.
Figure 25:
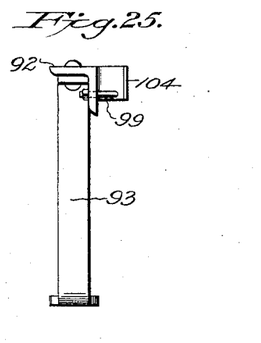
Fig. 25 is an end view of the same.
Figure 26:
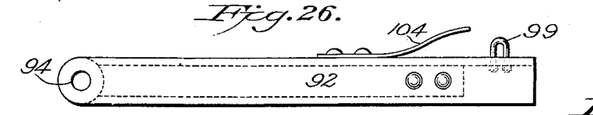
Fig. 26 is a plan view of the same, clearly showing a buffer-spring secured to the arm and a staple to which one end of a weighted cord or cable is intended to be attached.

The mechanism for holding the bucket while being dumped is as follows: Upon the under side of the channel 23 of the clip-guide and just rear of the point at which the bucket comes to a standstill is bolted an angle-bar 87, (see Figs. 20, 21, 22, and 23,) its depending member being toward the rear of the channel. A bolt 88 passes down through the bottom of the channel and through the horizontal member of the angle-bar, its head being countersunk, so as to lie flush with the bottom of the channel, and upon this bolt is pivoted a dog 89, which is held thereon by a nut 90, a washer being interposed between the angle-bar and dog and between the dog and the retaining-nut. The dog is bent centrally, so that its forward end will lie on a lower plane than its rear end, and a spring 91 is bolted to the vertical member of the angle-bar, the opposite end of which bears upon the rear edge of the dog forward of its pivotal point and normally holds its forward end out a suitable distance beyond the face of the channel, while its rear end contacts with the depending member of the angle-bar, and thus defines the outward movement of the forward end thereof. Just forward of the outwardly-extending end of the dog 89 and on the same plane therewith lies one end of a horizontally-disposed arm 92, (see Figs. 24, 25, and 26,) which is formed of an angle-bar whose depending member is on the side next to the dog. This arm is braced by a supporting-arm 93, which is bolted thereto near the outer end thereof and extends downwardly and rearwardly, its end lying beneath the rear end of arm 92. The rear ends of these arms 92 and 93 are provided with circular apertures 94, and a rod 95 is passed down through these apertures and through brackets 96 and 97, which are secured to an upright 98 on one of the longitudinal ties 2 of the terminal structure. The upright 98 does not extend high enough to obstruct the movement of the levers which operate the slides 25, 26, and 27. A staple 99 is bolted to the forward end of arm 92, and a rope or cable 100 is attached thereto and extends back to and partially around a sheave 101 on shaft 30, which supports lever 31. Thence the cable passes over a sheave 102 and downward a short distance, when its end is made fast to one end of a heavy chain 103, the other end of which is secured to the terminal structure. A spring 104 is bolted to the side of the arm 92, and the forward end of this spring normally rests against the end of the angle-plate 87, to which the dog 89 is pivoted. It will be seen that the arm has a swinging movement in the direction of movement of the buckets, but that it is normally held in the position shown in Fig. 4, or so that its spring 104 shall contact with the angle-plate 87, the weight of chain 103 holding it in this position. When a bucket is moved to the dumping position, an abutment 54$^B$ on its pendant will contact with the dog 89, which will be moved back and permit the bucket to pass. Immediately on passing the dog the said dog will be instantly thrown out by its spring, and thus prevent the rearward movement of the bucket, and at the same time the bucket will be caught by the end of the arm 92, which will swing slightly and relieve the bucket of any jar, but will be returned to its normal position by means of the weight of the chain 103. The bucket will thus be held between the dog 89 and arms 92 while being dumped; but the arm 92 will not prevent the bucket being carried forward by the arm 80 on slide 27, as it will swing to one side and permit the bucket to escape, and when it returns to its normal position its spring 104 will strike the angle-plate 87 and act as a buffer.

Figures 27, 28, 29, 30:
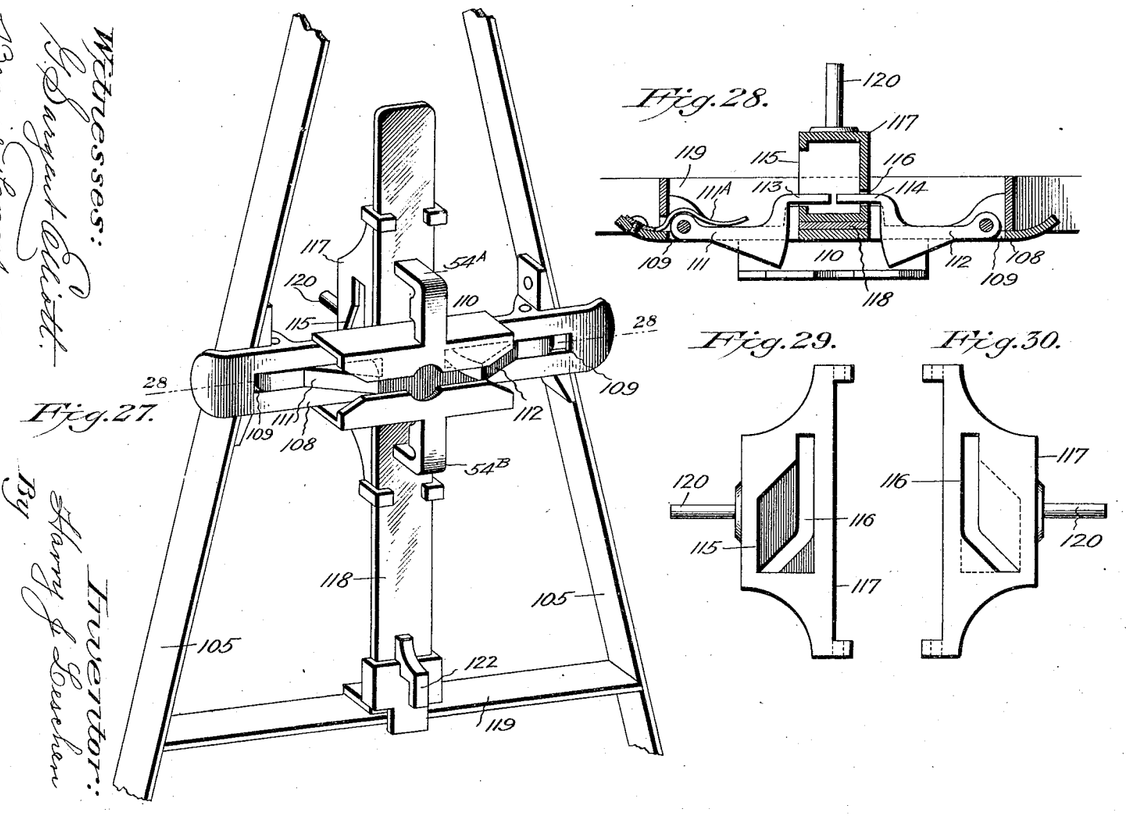
Fig. 27 is a perspective view of the bucket-pendant, showing the mechanism for holding and releasing the rope-clip.
Fig. 28 is a transverse sectional view through the same on the line 28 28 of Fig. 27.
Figs. 29 and 30 are side views of the slide which operates the dogs of the gripping mechanism, and thus locks the rope-clip to the bucket-pendant or releases the same therefrom.
Figure 31:
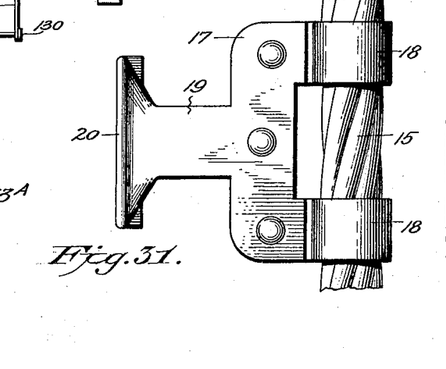
Fig. 31 is a plan view of the clip.

The gripping mechanism (see Figs. 27 and 28) which engages the rope-clips 17, by which the buckets are propelled, is secured to the pendants 105, to the lower ends of which the buckets 106 are pivotally attached, while their upper ends carry a suitable trolley 107, which runs on the track-rope 12 and track 9. A bar 108 is secured upon the pendant about midway between the bucket and trolley and on the side adjoining the clip-guide 21. The ends of this bar are curved outward, and longitudinal slots 109 are formed in the bar, one on each side of its center. A housing 110 is formed upon the center portion of the bar, comprising a pair of angle-plates, one of which is secured to the upper edge of the bar, while the other is secured to the lower edge thereof, their vertical members extending toward each other, but not meeting, thereby leaving a space or slot, as shown. This housing is open at each end, while its sides are formed by the bar and by the vertical members of the angle-plates, and it is of sufficient depth to permit the clip to pass freely through. Dogs 111 and 112 are pivoted in the slots 109, each dog having a head which extends out into the housing, there being a space between their heads great enough to allow the head of the clip free movement between the said dogs. The outer faces of the dogs incline outward from near their pivotal points to their free ends, and the free ends of the dogs extend back through the slots, and stems 113 and 114 are formed on these extensions which are parallel with the bar 108 and extend to within a short distance of each other. These stems pass through slots 115 and 116 in opposite sides of a slide 117, which has vertical movement on a bar 118, which is connected to the bar 108 and to a cross-brace 119, connecting the arms of the pendant above the bucket. The slots 115 and 116 are so formed that when the slide 117 is at the limit of its downward movement both dogs will be locked, so as to hold the head of the clip between them. When midway between its upward and downward limit, the dog 111 can be moved back, so as to be entirely out of the housing, its stem 113 being free to move in the widened portion of slot 115, while the dog 112 is still locked; but when the slide is moved to the limit of its upward movement the dog 111 may still be moved back, while the dog 112 is automatically moved by the angle portion of slot 116, which engages stem 114 and holds the said dog back, so as to permit the clip to pass out of the housing. The dog 111 is normally held out by a spring 111$^A$, while the dog 112 is operated altogether by slot 116 of the slide.

A pin 120 projects from the back of the slide 117, which engages a suitable guideway 121, to be presently described, by which the slide is moved up or down. When a bucket enters the terminal, the housing of the "grip" is on the same plane with the clip-guide, and the bucket is kept from swinging by a hook 122, which is secured near the lower end of the vertical bar 118 and which engages the track 8.

The abutments 54$^A$ and 54$^B$ are formed, respectively, upon the upper and lower plates of the grip-housing and are suitably secured to the bar 118.

The guideway 121 comprises a pair of rods which are secured at their extremities to trusses 123, which are bolted to the terminal structure. These trusses are substantially semicircular metal arms which extend over the tracks 9 and down a short distance below the plane of the clip-guide and a suitable distance therefrom. The upper rod of the guideway extends from the truss adjacent to the entrance of the terminal to about half-way to the opposite truss and on a plane above the slot of the clip-guide. It then dips down at an angle of thirty degrees until it is on a plane with the upper edge of the said clip-guide slot and is continued on this plane until within a short distance of the rear truss, when it takes a slight dip and is secured to the truss. The lower rod of the guideway is secured to the lower end of the first-mentioned truss and inclines upward at an angle of thirty degrees, as shown at 124, to within a short distance of the upper rod, and from this point it runs parallel with the upper rod throughout the remainder of its length and is secured at its end to the opposite truss. Where the guideway-rods run parallel, they are just far enough apart to allow the pin 120 of the slide 117 to pass easily between them. It will thus be seen that when a bucket enters the terminal the pin 120 will strike the incline 124 of the guideway, and the slide 117 will thereby be raised to its highest point, thus releasing both of the grip-dogs. The slide will continue in this position until the bucket reaches the point where the guideway dips downward, where the slide will be moved to its intermediate position, when dog 112 will be locked in its bucket-holding position and dog 111 will remain unlocked. This portion of the guideway is where the bucket comes to a pause and is dumped. From this point the slide remains in the same position until within a short distance of the end of the guideway, when another dip in said guideway moves the slide to the limit of its downward movement and locks both dogs again. The parts constituting the grip will then remain in the relative position just described until the bucket reaches the loading-terminal, when the operation above mentioned will be repeated.

The dumping mechanism comprises a pair of vertically-disposed arms 125, arranged a suitable distance apart and connected at their upper ends by a rod 126, which is outwardly curved at each end. This rod is designed to engage a pin 127 upon the bottom of the bucket, so as thereby to dump said bucket in a manner to be presently described. The arms 125 are pivotally connected about midway of their length to a pair of arms 128, which extend outward therefrom and are pivoted at their opposite ends to a suitable support or bracket 129. The lower ends of the arms 125 are pivoted to horizontally-disposed arms 130, which at their opposite ends are pivoted to brackets 131, bolted to the terminal structure. A rope 132 is secured at one end to one of the arms 125 and passes thence around suitably-positioned pulleys 133, so as to be out of the path of the levers 40 and 40$^A$, which operate the slides 25 and 27, and thence around one of a pair of pulleys $a$ and $b$, mounted on a sliding carriage 134, which moves in ways 135, suitably secured to the terminal structure a short distance forward of the rope-gripping sheave. After passing around the pulleys *a* the rope extends forward a short distance and is secured to the terminal. One end of a rope 136 passes around the pulley *b* of the carriage and extends rearward a short distance, passing around a pulley 137, after which it extends forward a short distance and is secured to the terminal. The opposite end of this rope extends rearward from pulley *b* to one end of an arm 138, the opposite end of which is pivoted to the outer end of an arm 139, having a hub at its opposite end which fits loosely upon the upper end of the shaft of the rope-gripping sheave. The under surface of this hub is formed into a clutch-face 140, which at a predermined time is designed to be engaged by a similar clutch-face 141, which is rigidly secured to the shaft of the gripping-sheave.

A suitable cam 142 is formed on the rear side of the hub of the upper clutch 140, and this clutch is normally held out of engagement with the lower clutch by a rod 143, having a sliding movement in a bracket 144, secured to the terminal. One end of this rod normally lies beneath the cam 142 and holds the upper clutch raised out of engagement with the lower clutch, while its opposite end is pivoted to one end of a lever 145, pivoted about centrally of its length to the bracket 144, its opposite end being pivoted to one end of an arm 146, which extends at right angles to the direction of the lever and is connected at its opposite end to a spring-arm 147, which is extended thence out over the tracks 9 in the pathway of the bucket-trolleys, its opposite end being secured to the terminal. Thus a trolley in passing will bend the spring in, which will rock lever 145 and draw rod 143 from beneath cam 142, when arm 139 will drop and clutch 140 will be engaged by clutch 141, thus revolving arm 139, to which is pivoted arm 138, to which one end of rope 136 is secured. The pivotal arrangement of arm 138 will cause an almost direct pull on rope 136, and carriage 134 will be drawn rearward, thus drawing upon rope 132, which will move the dumping-levers to the position shown in dotted lines in Fig. 3 and effect the dumping of the bucket.

In order to provide for the varying tension upon the traction-rope, due to expansion and contraction from heat and cold, the portion 148 of the terminal upon which the shaft 14 is journaled telescopes with the main portion of the terminal, and the track 9 is spliced on either side, as shown at 9$^A$, so that the parts may slide one upon the other. Rollers 149 are secured to the lower portion of the movable frame, which ride upon tracks 150, secured upon the lower ties 2, and facilitate the movement of the said frame. A cable 151 is secured to the movable frame adjacent to the lower end of the shaft 14, which cable passes over a pulley 152 and is provided with a heavy weight at its other end. This weight will exert a constant tension on the traction-rope through the movable portion of the terminal and keep the said rope evenly taut under all conditions.

The operation of the invention is as follows: Assuming that a bucket is at the dumping station and has been dumped and that an empty bucket is passing around the terminal, a loaded bucket will then be entering the terminal, and the pin 120 of the grip-slide 117 will ride up the incline 124 of the guideway 121 and release the dogs in the manner previously described, when the rope-clip will escape from the grip. The abutment 54$^A$ of the grip will at this juncture be caught between the dog 53 and stop 52 of slide 25, while the clip as it escapes from the grip will immediately engage the dogs of slide 26, which lies alongside the slide 25, and will carry it forward. This forward movement of the slide 26 will operate levers 40 and 40$^A$, which are attached to the slide, and will operate their coöperating levers 31 and 35 and 31$^A$ and 35$^A$. The lever 35 will carry the slide 25 and bucket to the dumping position, where the grip-abutment 54$^B$ will be caught between the dog 89 and arm 92, and simultaneously the projection 50 on stop-arm 49 will engage the trip 50$^A$ and allow the bucket to escape the stop 52. At the same time the slide 25 started forward with its loaded bucket the slide 27 was at the dumping-station and the hook 82 of its arm 80 engaged the grip-abutment 54$^A$ of an empty bucket. This slide starts simultaneously with slide 25 by its lever 35$^A$, draws the bucket from behind the swinging arm 92, and carries it to the rear end of the clip-guides. As it arrives at this point the slide 26, which is carried by the clip, will arrive simultaneously, and the stem of the clip will pass beneath the plate 86 of the arm 80, raise the said arm, and permit the abutment 54$^A$ to escape the stop 83 of the arm, and as the clip raises the arm it at the same time passes into the bucket-grip. Just as the clip raises the arm 80 and passes into the bucket-grip the forward dog 68 of slide 26 engages the pin 71$^A$ on the inside of the clip-guide, which raises the dog and permits the clip to pass on, carrying the empty bucket with it. The levers are then returned to their normal position by means of a rope 153, which is attached to lever 35 and which passes back and around a pulley 154 on vertical shaft 30, which supports lever 31. Thence it passes over a pulley 155 and extends down a suitable distance, its end being attached to one end of a heavy cable or chain 156, which is attached at its other end to the terminal, the cable acting as a weight which draws upon the rope and returns the arms to their normal position. As the slide 27 reaches the dumping-station the hook 82 of arm 80 will engage grip-abutment 54^A of the empty bucket, and will thus be in position to move the bucket forward upon the next operation of the levers.

Figure 8:
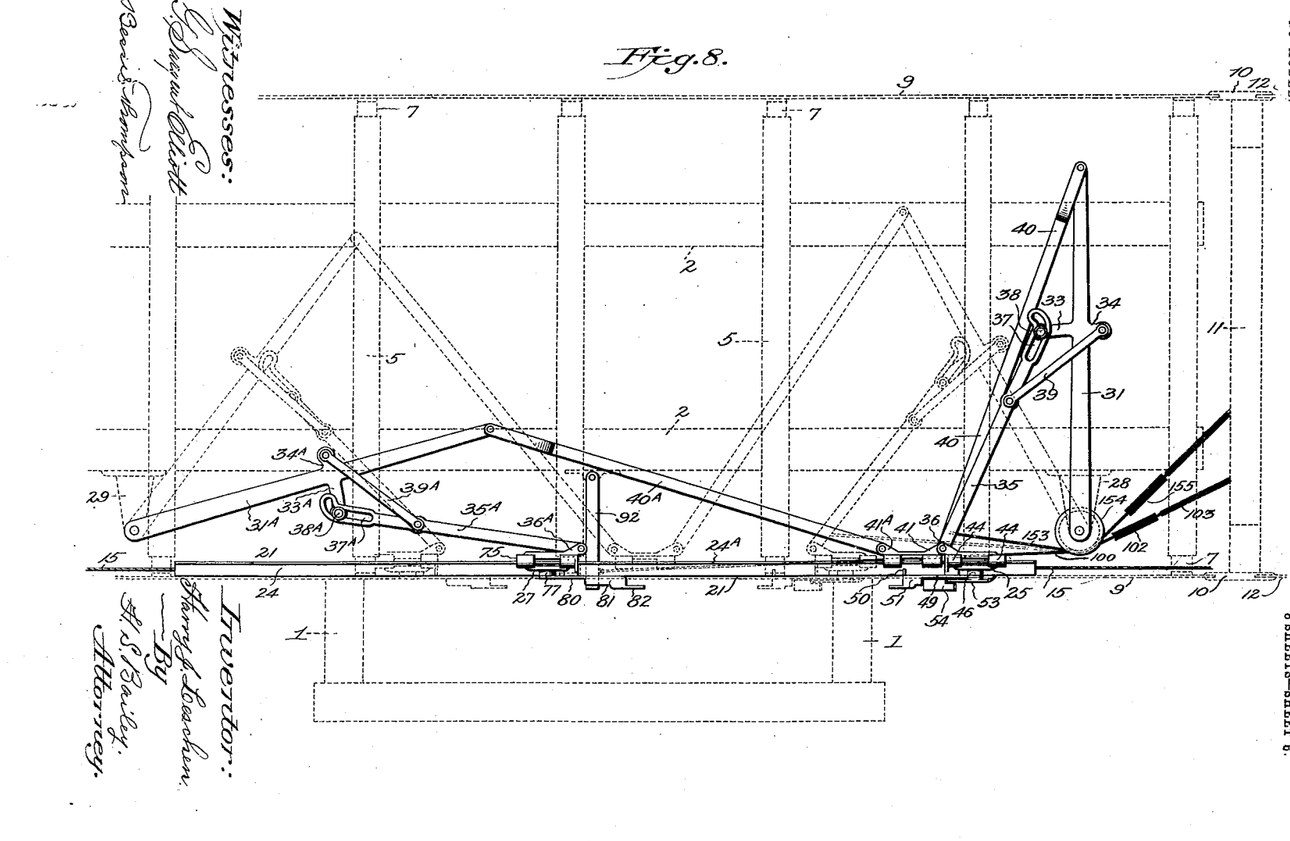
Fig. 8 is a fragmentary plan view of the terminal, showing the slides and the bucket-operating levers in normal position in full lines and at a point in their operative movement in dotted lines.
Figure 9:
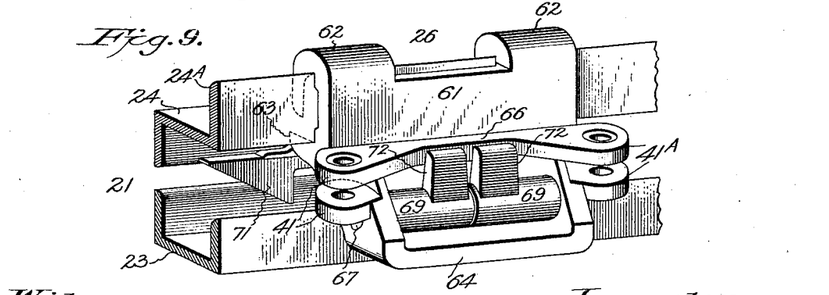
Fig. 9 is a perspective view taken from the rear of the sliding frame which supports the dogs, showing the same mounted upon a track-flange of the clip-guide and showing the lugs at the rear ends of the dogs which contact with the sliding frame and hold the dogs in their normal position.
Figure 10:
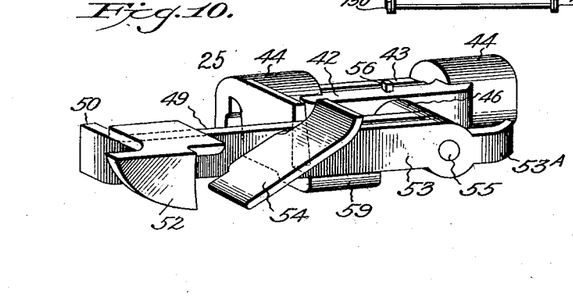
Fig. 10 is a perspective view of a sliding frame upon which is pivotally mounted a stop-arm and dog which constitute the forward bucket receiver and carrier.
Figure 11:
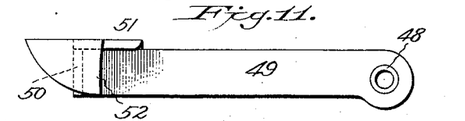
Fig. 11 is a side elevation of the stop-arm of the forward bucket receiver and carrier.
Figures 12, 13:
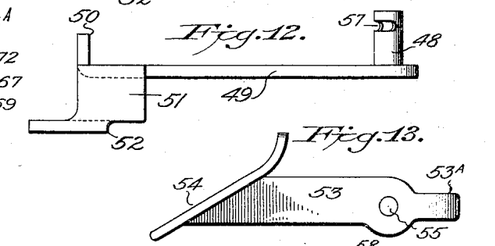
Fig. 12 is a plan view thereof.
Fig. 13 is a side elevation of the dog which acts in conjunction with the stop-lever to hold and carry the bucket.
Figure 14:
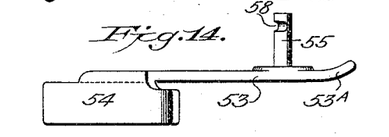
Fig. 14 is a plan view thereof.

The function of the right-angled slots 37 and 37^A is to permit the pins 38 and 38^A freedom of movement to pass the centers of the levers 39 and 39^A, as well as control the movement of the levers 35 and 35^A, to successively retard the movement of and stop the incoming buckets, as these pins reciprocally slide in them and in conjunction with the levers 39 and 39^A actuate the levers 35 and 35^A to retard the buckets as they come into the terminal, as when the levers 40 and 40^A are in their normal position of disuse these right-angled slots are above the levers 39 and 39^A, as shown at the right of Fig. 8; but when they are extended to the ends of their operative movement they are below the levers 39 and 39^A, as shown at the left in Fig. 8. When the levers 40 and 40^A first start to make an operative stroke, they are caught and moved with a jerk by the incoming clips, and the pins 38 and 38^A move at first toward their respective slides 25 and 27, while the levers 35 and 35^A start much slower, as they are pushed by the levers 39 and 39^A and the levers 31 and 31^A; but after the levers 40 and 40^A have traveled a portion of their movement the pins 38 and 38^A reverse the direction of their movement in the right-angled slots and move in them toward the outer right-angled free end of the levers 35 and 35^A.

Having described my invention, what I claim as new, and desire to secure by Letters Patent, is—

1. In an automatic tramway, the combination with the terminals and buckets, of a bucket-carrier reciprocally mounted on said terminal and means including a duplex system of levers connected with said carrier for gripping and moving and accelerating the speed of said buckets.

2. In an automatic tramway, the combination with the terminals and the buckets, of a bucket-carrier reciprocally mounted on said terminal, a grip on said carrier for locking said carrier to said buckets and means including a clip-operated slide reciprocally mounted on said terminal for gripping, starting and accelerating the speed of said buckets a predetermined distance on said terminals, substantially as described.

3. In an automatic tramway, the combination with the terminal, the traction-rope and clips and the buckets, of the bucket-slideway on the terminal, the bucket-accelerating slide, and means connected with said bucket-accelerating slide for gripping, moving and accelerating the movement of the buckets for a predetermined distance along said slideway, substantially as described.

4. In an automatic tramway, the combination with the terminals, the traction-rope and clips, the buckets and the clip guideway and slideway on said terminal of the clip-slide adapted to be reciprocated a predetermined distance intermittently by said traction-rope and clips on said slideway, a slide reciprocally mounted on said slideway, means connected with said slide for gripping and releasing a bucket and means connected with said slide for starting and moving and accelerating the speed of said buckets, substantially as described.

5. In an automatic tramway the combination with the terminal provided with a bucket loading or dumping station, the traction-rope, the clip, and the buckets, of a bucket starting and accelerating device comprising a slide reciprocally mounted on said terminal, a clip-operated slide reciprocally mounted on said terminal and provided with dogs arranged to engage the clips of said traction-rope and adapted to be moved by said traction-rope and clips a predetermined distance, and levers connected to said clip-slide and said bucket-slide arranged to grip the buckets at the starting-station and start and accelerate the speed of said buckets, substantially as described.

6. In an automatic tramway, the combination with the terminals, the traction-rope and clips, and the buckets of a device reciprocally mounted on said terminal and adapted to receive and grip each bucket as it enters said terminal and for moving each bucket to and releasing it at the standing-station, means for releasing said bucket from said clip when said slide receives and grips said bucket and a carrier reciprocally mounted on said terminal and arranged to grip, start and accelerate the speed of each bucket at the bucket standing-station, and for releasing said buckets and locking them to said clips when they have attained a predetermined speed, substantially as described.

7. In an automatic tramway, the combination with the terminal, the traction-rope and clips and the buckets, of a bucket-accelerating device comprising a clip-operated slide reciprocally mounted on said terminal adapted to be automatically attached to and released from said clips, a bucket starting and accelerating slide reciprocally mounted on said terminal provided with a bucket-gripping device adapted to engage and grip to a bucket, and a suitable lever mechanism connected to said slides, arranged and adapted to cause said clip-slide to cause said bucket-slide to grip, start up and accelerate the speed of said bucket for a predetermined distance along said terminal, substantially as described.

8. In an automatic tramway, the combination with the terminal, the traction-rope, the rope-clip and the buckets, of means for attaching and detaching the bucket to and from said clips at said terminals, a guideway on said terminal, a slideway on said guideway, a bucket receiving and gripping slide on said slideway, a clip-operated slide also on said slideway arranged and adapted to engage said clip after it has been released from said buckets, a bucket-gripping slide on said slideway arranged to grip said buckets, and a plurality of levers attached to said slides and arranged to catch and retard the incoming buckets, and bring them to a stop at a predetermined point and to grip and start and accelerate the speed of said buckets substantially as described.

9. In an automatic tramway, the combination with the terminals, the traction-rope and clips and the bucket, of a slideway on said terminal, a clip-operated slide slidably mounted on said slideway and adapted to be engaged and carried along said slideway by said clips a predetermined distance, a bucket receiving and gripping slide on said slideway at the bucket-entrance end of said tramway, means for releasing said clip from said bucket when said bucket enters said bucket-gripping slide, means including levers attached to said bucket-gripping, and to said clip-operating slides arranged and adapted to cause said clip-gripping slide to continuously retard the speed of said buckets and bring them to rest and release them at the loading or dumping station of said terminal, and a bucket starting and accelerating slide slidably mounted on said slideway, and means including levers operatively arranged and adapted and attached to said bucket-starting slide, and said clip-operating slide to cause said bucket-starting slide to grip said buckets at the loading and dumping station and start and accelerate their movement and release them at a predetermined point, and means for releasing said clips from said clip-operating slide and for attaching said clips to said buckets at the point they are released by the bucket starting and accelerating slide, substantially as described.

10. In an automatic tramway, the combination of the terminal, the traction-rope, and clips, the buckets, the clip-guideway and the slideway, with the bucket starting and accelerating slide reciprocally mounted on said slideway and means including a clip-operated slide reciprocally mounted on said slideway for causing said bucket-slide to start and accelerate the speed of said bucket, substantially as described.

11. In an automatic tramway the combination of the terminals, the traction-rope and clip and the buckets, of the slideway, the bucket-receiving slide and the clip-receiving slide reciprocally mounted on said slideway, with a slide reciprocally mounted on said slideway, a lever pivotally attached at one end and having its opposite end arranged to engage a bucket, and means including said traction-rope and clip and a system of levers for moving said slide to pick up, start, and accelerate the movement of said buckets, substantially as described.

12. In an automatic tramway, the combination of the terminal, the traction-rope and clip, the buckets, the clip-guideway and the slideway, the bucket-receiving slide and the clip-slide mounted on said slideway, and the system of levers connecting said slides, with a bucket gripping, moving and accelerating slide reciprocally mounted on said slideway having an arm pivoted to it at one end and adapted to engage said buckets with its free end and hold and release said buckets at a predetermined point on the reciprocal movement of said slide, a lever pivotally secured at one end to said clip-slide and means including a plurality of levers connected with the free end of said lever and with said bucket-accelerating slide for engaging, starting and accelerating the speed of said buckets a predetermined distance along the length of said terminal, substantially as described.

13. In an automatic tramway, the combination of the terminal, the traction-rope and clips, the buckets, the clip-guideway, the slideway on the guideway, the bucket-receiving slide, and the operating-levers, with the bucket-accelerating slide, comprising a carrier reciprocally mounted on said slideway, an arm pivotally mounted on said carrier at one end having its free end projecting into the path of said bucket, a bucket-engaging device on the free end of said arm, a slideway on said arm arranged in the path of said clips, a lever pivotally secured at one end to said carrier, a curved slotted end in the opposite end of said lever, an abutment-lever pivotally connected at one end to said terminal, a lever pivotally connected at one end to the opposite end of said abutment-lever and pivotally connected at its opposite end to said clip-slide, a lateral extension on said abutment-lever intermediate of its ends pivotally secured in the slotted end of said curved-ended lever, a second lateral extension on said abutment-lever intermediate of its ends, a lever pivotally secured at one end to said second lateral extension of said abutment-lever and pivotally secured at its opposite end to said curved-end lever, substantially as described.

14. In an automatic tramway the combination with the terminals having a bucket-standing station, the clip-slide, the buckets and the guideway, the bucket receiving and gripping slide, the clip and bucket releasing guide-rods, the clip-operated slide and the bucket-retarding levers operatively connected to said slides, of a bucket engaging, starting and accelerating device comprising a slide reciprocally mounted on said slideway, means connected to said slide for engaging and releasing a bucket, a lever mechanism connected to said clip-slide and to said terminal and arranged and adapted to cause said engaging slide to engage said buckets at said standing-station and to start, move and continuously accelerate the movement of said bucket for a predetermined distance on said slideway and a spring-controlled stop in the path of said buckets arranged and adapted to automatically engage and hold and release them intermittently, and in unison with the operative movements of said slides and of the passages of said clips through said terminal, substantially as described.

15. In an automatic tramway, the combination with the terminal having a bucket-stopping station, the clip-guideway, the traction-rope, the buckets, and the slideway, of a bucket-stop at said stopping-station, comprising an arm pivotally secured intermediate of its end to said terminal and arranged with one end normally in contact with a suitable abutment and having a spring arranged to normally hold its free end in the path of a suitable part of said buckets, substantially as described.

16. In an automatic tramway, the combination with the terminals having a bucket-stopping station comprising the traction-rope and clip, the buckets and the track-rope and track means for releasing said clips from the buckets coming into said terminals from said track-ropes, means for retarding the movement of said buckets and stopping them at the standing-station, and means for automatically locking, holding and releasing said buckets at their standing-station comprising an arm pivotally mounted at one end to said terminal and having its free end normally held across the path of said buckets at said standing-station and adapted to define the limit of said buckets' incoming movement on said terminal and the starting-point of their outgoing movement and means for loading or dumping said buckets at said stopping-station, and for starting said buckets and moving said arm out of their way and returning it to its normal position and for accelerating the speed of said buckets to about the speed of said traction-rope and for again attaching said buckets to said traction-rope, substantially as described.

17. In an automatic tramway, the combination with the terminals the traction-rope and the buckets, of a bucket stopping, holding and standing station on said terminals comprising a lever-spring controlled in one direction of its movement positioned at the said stopping-station in the passing path of said buckets at the end of their run over the tramline and adapted to be moved aside by said buckets and to move resiliently behind them and prevent their backward movement after they have reached said stopping-station, and a swinging arm reboundingly positioned normally across the path of said buckets and arranged and adapted to stop said buckets at said station, and means for detaching said buckets from said traction-rope and clips and for stopping, and for loading or dumping, and for again starting, accelerating and again attaching said buckets to said traction-rope, substantially as described.

18. In an automatic tramway, the combination of the terminal, the clip-guideway and the slideway, the traction-rope and clips and the buckets and means for locking and unlocking said clips to and from said buckets, with the bucket stopping and holding dogs at the bucket-stopping station, and a slide reciprocally mounted on said slideway, an arm pivotally connected at one end to said slide, a projection on said buckets, a yoke-shaped hook or latch adapted to engage said projection on said buckets, an inclined plate on the free end of said arm arranged in the traveling path of said traction-rope clips and adapted to permit said clips to raise said arm and disengage it and said slide from said buckets at a predetermined point on said slideway, and means including said clips for engaging, starting and moving said buckets from said stopping-station and for attaching them to said traction-rope, substantially as described.

19. In an automatic tramway, the combination with the terminal having a stopping-station, the slideway and clip-guideway, the traction-rope and clip and the buckets, of a bucket-starting slide reciprocally mounted on said slideway, means connected with said bucket-starting slide for engaging said buckets at said bucket-stopping station, means including said clips for holding, and releasing said buckets at the end of a predetermined movement of said slide and buckets along said slideway, a lever pivotally secured at one end to said bucket-starting slide, a substantially right-angled curved end at the opposite end of said lever provided with a curved slot, a lever pivotally secured at one end to said terminal, a cross-bar lateral extension on said lever intermediate of its ends, a pivotal connection between the end of one cross-bar and the slotted curved end of said bucket-starting-slide-connecting lever, a lever pivotally connected at one end to the end of the opposite cross-bar and at its opposite end pivotally connected to said bucket-starting-slide-connecting lever intermediate of its ends, a clip-operated slide reciprocally mounted on said slideway, means for automatically attaching said slides to and releasing them from each clip as they travel to the opposite ends of a predetermined reciprocal movement of said clip-operated slide on said slideway, and a lever pivotally secured at one end to said clip-slide and pivotally connected at its opposite end to said cross-bar lever whereby said clips intermittently reciprocate said clip-slide which causes said levers to start and gradually accelerate the speed of said bucket-starting slide for a predetermined distance along said slideway from said buckets' stopping-station, and means for releasing said buckets at the end of said slides' operative bucket-accelerating movement and for returning said bucket-slide to engage a bucket at said standing-station and said clip-operated slide and the said levers to their normal standing positions, and means for connecting said traction-rope and clips and buckets together at the point where said buckets are released from said bucket-starting slide, substantially as described.

20. In an automatic tramway the combination with the terminals, the buckets and the clip-guideway on said terminal, of the bucket-stop lever pivotally secured to the bottom of said slideway, the abutment arranged to engage one end of said lever and the spring arranged to normally hold one end of said lever in the passing-path of said buckets and its opposite end against said abutment, substantially as described.

21. In an automatic tramway, the combination with the terminal and the clip-guideway, and the buckets, of a depending abutment on the bottom of said guideway, a lever pivotally secured to the bottom of said guideway, a spring arranged to resiliently hold one end of said lever in the passing-path of said buckets and to hold the opposite end against said abutment, substantially as described.

22. In an automatic tramway the combination with the terminal having a bucket loading or dumping station and a clip-guideway on said terminal and the buckets, of the spring-controlled lever pivotally secured to the bottom of said guideway at said station in the passing-path of said buckets, and adapted to be pushed aside by a passing bucket and to resiliently move behind said buckets as they reach the loading or dumping station and hold them against backward movement, substantially as described.

23. In an automatic tramway having a bucket loading or dumping station, the combination of the terminal and the buckets, of an arm pivotally secured to one end of said terminal at right angles to the path of said buckets and having its free end extend across the path of said buckets, an abutment depending from said terminal, a buffer-spring secured to said arm and arranged to bear on said abutment and a weighted rope arranged and adapted to normally hold said arm against said abutment at said loading and dumping station, substantially as described.

24. In an automatic tramway, the combination with the buckets and the terminal having a fixed bucket loading and dumping station comprising a swinging arm pivotally secured at one end to said terminal and extending across the path of said buckets at a predetermined point on said terminal, of an abutment on said terminal, a weighted rope secured at one end to the free end of said arm and having its opposite end provided with a weight arranged to normally hold the free end of said arm against said abutment and to stop an incoming, slowing-up bucket and to permit said arm to be swung by a bucket out of its path at a predetermined time, a buffer secured between said arm and said abutment and the stop-lever pivotally secured to said terminal at a short distance from said arm toward the rear or incoming bucket end of said terminal having one end spring controlled and arranged to project into the path of a passing bucket and to be moved aside by a passing bucket and to drop behind it after it has passed between it and said stop-arm whereby said buckets are positively held against forward or rearward movement between said stops, substantially as described.

25. In an automatic tramway the combination with the terminal, the traction-rope and clips and the buckets, of a fixed bucket stopping and holding and loading or dumping station on said terminal comprising the swinging arm, the abutment, the buffer-spring between said arm and said abutment, and the weighted rope, and the spring-controlled stop-lever, substantially as described.

26. In an automatic tramway the combination with the terminal having a bucket loading or dumping station, the traction-rope and clip, the buckets and the clip-operated slide, of the bucket starting and accelerating device comprising the bucket-slide, the hooked lever on said slide adapted to grip a bucket at said loading and dumping station, the curved-ended lever pivotally secured to said slide, the crossed-arm abutment-lever pivotally secured at one end to said terminal and the lever pivotally secured at one end to the free end of said cross-armed lever and pivotally secured at its opposite end to said clip-operated slide, substantially as described.

27. In an automatic tramway, the combination with the terminal, the clip guideway and slideway and the clip-operated slide, of the bucket-starting slide, brackets secured to said terminal, a vertical shaft journaled in said brackets, the horizontal crossed-arm abutment-lever pivotally secured at one end to said vertical shaft, the lever pivotally secured at one end to the free end of said cross-armed abutment-lever and the curved-ended lever pivotally secured at one end to said slide and at its opposite end to said cross-armed abutment-lever, substantially as described.

In testimony whereof I affix my signature in presence of two witnesses.

HARRY J. LESCHEN.

Witnesses:
J. P. SWENEY,
E. P. KIPP.